INVENTOR.
KARL HEINZ STEIGERWALD
BY
Emery Whittemore Sandoe & Graham
ATTORNEYS

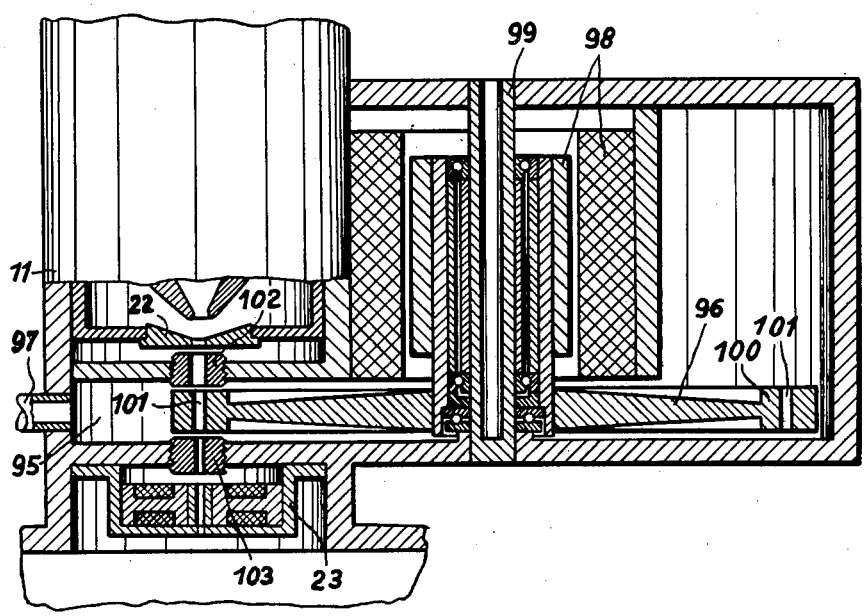
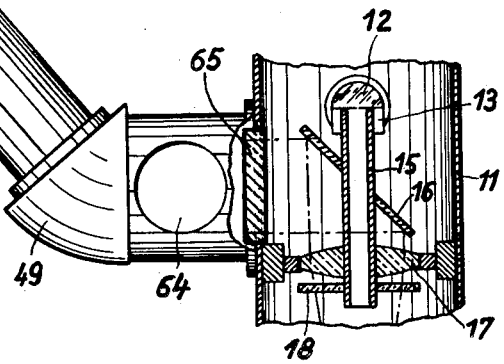

INVENTOR.
KARL HEINZ STEIGERWALD

BY
Emery Whittemore Sandoe & Graham

ATTORNEYS

INVENTOR.
KARL HEINZ STEIGERWALD

BY

ATTORNEYS

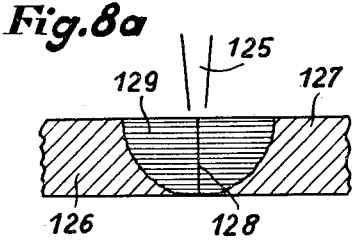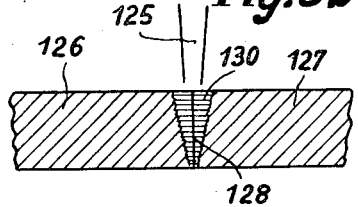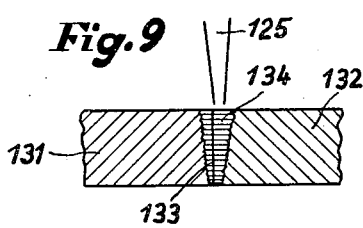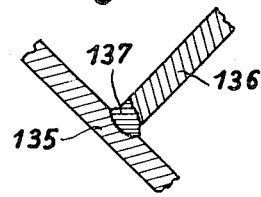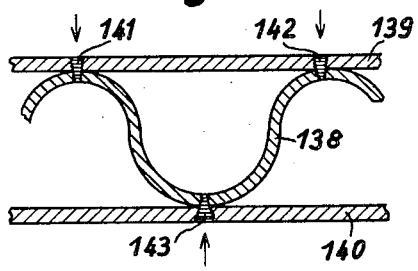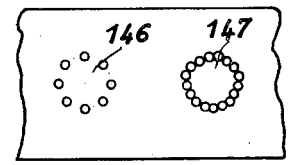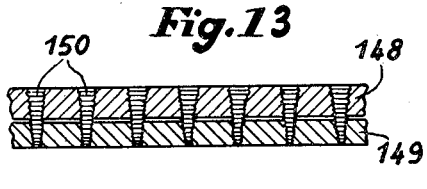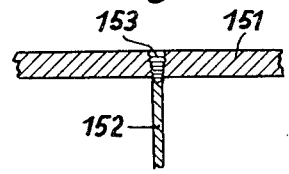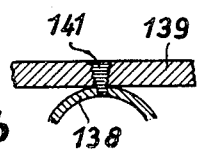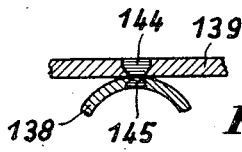

United States Patent Office 2,987,610
Patented June 6, 1961

2,987,610
METHOD AND MEANS FOR WELDING USING A CONTROLLED BEAM OF CHARGED PARTICLES
Karl Heinz Steigerwald, Heidenheim, Germany, assignor to Carl Zeiss, Wurttemberg, Germany
Filed May 29, 1959, Ser. No. 817,708
Claims priority, application Germany Feb. 20, 1959
11 Claims. (Cl. 219—117)

This invention relates to welding, and more particularly, to an improved method and means for welding using a controlled beam of charged particles.

When welding is done by means of a source of energy which applies the energy to the surface of the material to be welded, for example, when welding is done by means of a flame, by means of an electric arc, by means of electrodes, etc., the surface is heated directly by the source of energy and the propagation of heat into the material required for melting a greater area of material is effected by heat conduction.

It has also been proposed to use an electron beam as means for supplying the necessary energy, but the electron beam has been used only for heating a surface area at the desired place on the work piece. Melting of the material to form the weld is caused by the propagation of energy taking place by heat conduction through the material.

None of the welding processes mentioned offers the possibility of limiting the melting of the material to be welded to a narrow region of the surfaces to be bonded, since the thermal energy in the material is propagated practically uniformly in all directions by heat conduction. Another disadvantage of the known welding processes resides in that the propagation of energy by heat conduction in the material is comparatively slow.

Moreover, the known welding processes generally make it necessary to use special seam shapes, such as, for example, the known V-seam, and welding materials for filling in the seam.

It is, therefore, one object of this invention to provide improved method and means for welding material by melting the material at the weld seam in a narrow channel extending through the weld seam.

It is a further object of this invention to provide improved method and means for welding material in which only a small region of the material adjacent the weld is subjected to heat stress.

It is a further object of this invention to provide an improved method and means for welding material at high speed in which the heat conductivity of the material does not limit weld speed.

It is a further object of this invention to provide an improved method and means of welding material together without preparing shaped welding seams.

In the welding process according to the present invention, a beam of charged particles is used as means for supplying energy, said beam being focused, according to the invention, at or close to the weld and its intensity being so regulated that the beam, forming a narrow, highly heated channel at the place of impingement, penetrates into the material and, in so doing, simultaneously yields its energy to the material throughout the entire depth of penetration. The intensity of the beam is controlled to ensure that a certain minimum density of energy dependent on the kind of material to be welded reaches the material at the place of impingement. As soon as this density of energy is attained, the beam penetrates into the material to a depth which depends on the material and on the beam intensity forming a narrow, highly heated channel and simultaneously melting the material. While the beam thus penetrates, the material laterally adjacent the beam is melted simultaneously over the entire depth of penetration of the beam. If the beam is now moved on, the molten metal flows together and fuses into a proper weld.

This new process for welding has the great advantage that only a small region of the material adjacent the weld is subjected to heat stress. On the other hand, if the welding is carried out in the manner known in the past, whereby a beam is directed at the weld heating the material superficially only, the thermally stressed area of material is about 5 to 10 times the area heat-stressed in the new welding process.

The new welding process has the additional advantage that the welding can be carried out at comparatively high speed. This is due to the fact that only comparatively thin regions of material adjacent the channel of penetration of the beam must be heated and melted, said heating taking place simultaneously along the depth of penetration of the beam. In the known welding process, on the other hand, the superficially generated heat must first penetrate, comparatively slowly, into the material by heat conduction and cause the melting of a comparatively large volume of material.

It is advantageous in many cases to select an intensity of the beam of such magnitude that the beam completely penetrates the material. This procedure will ensure that the work pieces to be welded are welded together over the entire depth of the seam.

The penetration of the beam into the material can be observed plainly. The possibilities of so doing are described below. As soon as the beam penetrates into the work piece, an easily observed characteristic sparking occurs on the upper surface of the material. Observation of the surface of the material thus permits one to conclude unequivocally that the charge carrier beam has penetrated into the work piece as soon as the above-mentioned sparking occurs. There also exists the possibility of measuring the temperature of the material to be treated at or close to the surface. If the minimum temperature required for the penetration of the beam is known, it can be concluded that the beam actually penetrates into the work piece when this temperature is reached.

In many cases, the minimum density of energy of the beam required for the penetration of the beam is determined by preliminary tests. It is then possible to control the attainment of this minimum density of energy during the welding process proper by controlling the operating potentials of the beam generator such as an electron gun.

The penetration of the charge carrier beam into the material also produces a sudden change of the X-ray radiation occurring above the material. Measuring of said radiation will permit the observer to conclude unequivocally that the beam is penetrating.

It is equally simple reliably to determine that the beam is passing through the material to be treated. Several possibilities exist, some of which will be mentioned below.

If an electrode is arranged underneath the work piece to be treated and spaced therefrom, the current absorption of said electrode will unequivocally determine that the beam has penetrated. Another possibility consists in placing the work piece in an insulated position and in measuring the current absorption of the work piece as the beam intensity is increased. As soon as the rate of increase in current absorption decreases, the beam has penetrated the work piece.

If devices are arranged underneath the work piece to measure the current caused by the stray and secondary electrons emitted, the increase of said current will prove clearly that the beam has penetrated the material.

Another method for measuring penetration consists of arranging a detectable substance, such as a radio-active substance, below the work piece to be welded. A detector is positioned below the work piece with a field of view which does not include the substance. Thus, no detection of the substance is made if the welding beam does not penetrate the material.

If the beam penetrates the material, the detectable substance is evaporated into the detector field of view. A detector output then indicates beam penetration.

Furthermore, when the beam penetrates the material, an easily observed characteristic sparking occurs on the underside of the material. If the underside of the material is observed during the welding process by a suitable observation device, the luminous phenomenon caused by the sparking proves conclusively that the beam has penetrated the material.

The sectional view of the weld seams produced by means of the new welding process clearly differs from that of the weld seams produced according to the welding processes known in the past. Whereas the latter has a characteristic cross sectional profile of the melted zone formed by the radial expansion of the heat from the surface, the weld seams produced according to the new welding process have only a very narrow V-shaped melted zone.

When welding in accordance with this invention, the beam penetrating the material is often focussed much more sharply than can be attributed to the beam focussing apparatus. The additional focussing is probably caused by positive charge accumulation in the surface of the material. Such additional focussing is advantageous since the beam penetrates the material even more quickly on a narrow cross section. It is, therefore, possible to weld with a minimum of energy applied.

Tests have shown that the new welding process makes it possible to obtain welding velocities of about 70 to 80 cm./min. with the new welding process. It is advisable, for example, for welding zirconium plates of about 4 mm. thickness, to use a beam of 0.1–0.2 mm. $\phi$, the beam current intensity of which amounts up to 10 mA and the accelerating voltage of which amounts to 100 kv.

The new welding process offers the possibility of producing every kind of weld seam very rapidly and with minimal heat stress of the material treated. For example, if longer weld seams are to be made, the charge carrier beam, immediately upon reaching the desired depth of penetration into the material, is moved in the direction of the seam at such velocity that the desired depth of penetration remains constant during the entire welding process.

If the problem consists in welding two work pieces together, with the first work piece having an edge in contact with a side of the second work piece, this problem is advantageously solved by using the new welding process. The beam is directed at the free side of the second work piece with intensity sufficient to penetrate the second work piece in the direction of and along the edge of the first work piece, thereby producing a weld between the two work pieces. The new welding process also permits welding together of two work pieces, one of which, seen in the direction of the beam, is located underneath the second work piece. In this case, the beam is controlled in such a manner that it penetrates the top work piece and cuts into the second work piece. This manner of controlling the beam produces a satisfactory weld while subjecting the work piece to minimum heat stress.

The above-described method permits, for example, welding together of two or more plates arranged in succession when seen in the direction of the beam by straight welds or welds extending along certain predetermined lines. It is equally possible to weld a covering plate onto a work piece of any shape whatsoever, whereby the welding may be effected, for example, only at specific places or along specific lines of said work piece. Another advantage of the new welding process consists in that it also permits to weld any work piece, for example, a lattice-like work piece, between two plates.

The new welding process can very advantageously also be used to produce punctiform weld of two work pieces. To achieve this purpose, it is necessary to switch off the charge carrier beam after it has reached the desired depth of penetration into the material and after it has yielded an amount of energy sufficient to melt a sufficiently large area. This method produces a "spot welding" which is substantially simpler to carry out than the weldings produced according to the known spot-welding processes. Such weldings require the use of two electrodes which are applied to the work piece from both sides. When producing "spot weldings" by means of the beam of charged particles, the work piece to be treated need be accessible from one side only.

In many cases, it is advantageous so to control the beam that "spot welding" are formed. The beam, however, is moved on between separate weldings. This can be done in such a manner that a weld seam is formed which consists of adjacent, overlapping or separate welded points. In order to produce point-like weldings of two work pieces, it is particularly advantageous to guide the beam in a circular path containing the selected fastening point as its center and to switch off the beam after it has traveled over this path. A maximum of solidity is thus obtained by means of a minimum of the energy used. It may also be expedient to move the beam along a path arranged spirally about the fastening point.

The new welding process may also be used for welding work pieces formed of thermally very different materials. If the charge carrier beam is focused exactly at the seam, the material having a lower melting point is overheated before the material having a higher melting point is melted. Said over heating is very brief and will generally not damage the material. In many cases, however, it is better to avoid overheating a material by focussing the beam at the work pieces to be welded so that the energy is fed to them proportionately corresponding to the difference of the thermal properties of their materials. It may be advantageous so to focus the beam at the work pieces to be welded that it penetrates only into the work piece made of the material having the higher melting point in the immediate vicinity of the seam. In this case, a small portion of the material having the higher melting point is melted and said area of molten material yields so much energy to the material having the lower melting point that a proper fusion of the two materials is had.

The invention is explained in greater detail by way of the embodiments illustrated in the accompanying drawing, in which:

FIGURE 2 is a partial section through the apparatus of FIGURE 1 taken along the line II—II;

FIGURE 7 is a partial sectional view of an apparatus for welding with the aid of a beam of charged particles by making use of an intermediate pressure chamber containing a movable shutter;

FIGURE 8a is a sectional view through two work pieces welded together which have been worked according to any of the known welding processes;

FIGURE 8b is a sectional view of two work pieces welded together by means of the new welding process;

FIGURE 9 is a sectional view of two work pieces consisting of thermally different materials which have been welded together by means of the new process;

FIGURE 10 is a sectional view of a set-up seam produced by means of the new welding process;

FIGURE 11 is a sectional view through a shaped plate welded to a cover plate and a base plate;

FIGURE 12 is a top view of a work piece treated by means of the new welding process;

FIGURE 13 is a section through two plates welded together by means of the new welding process;

FIGURE 14 is a sectional view of a set-up seam produced by means of the new welding process;

FIGURE 15a is a spot welding carried out according to one of the known processes;

FIGURE 15b is a spot welding carried out by means of the new welding process.

FIGURE 1 shows an apparatus constructed according to the invention for welding with the aid of an electron beam, wherein discharge of the electron beam is controlled by impulses during the welding operation.

Figure 1:
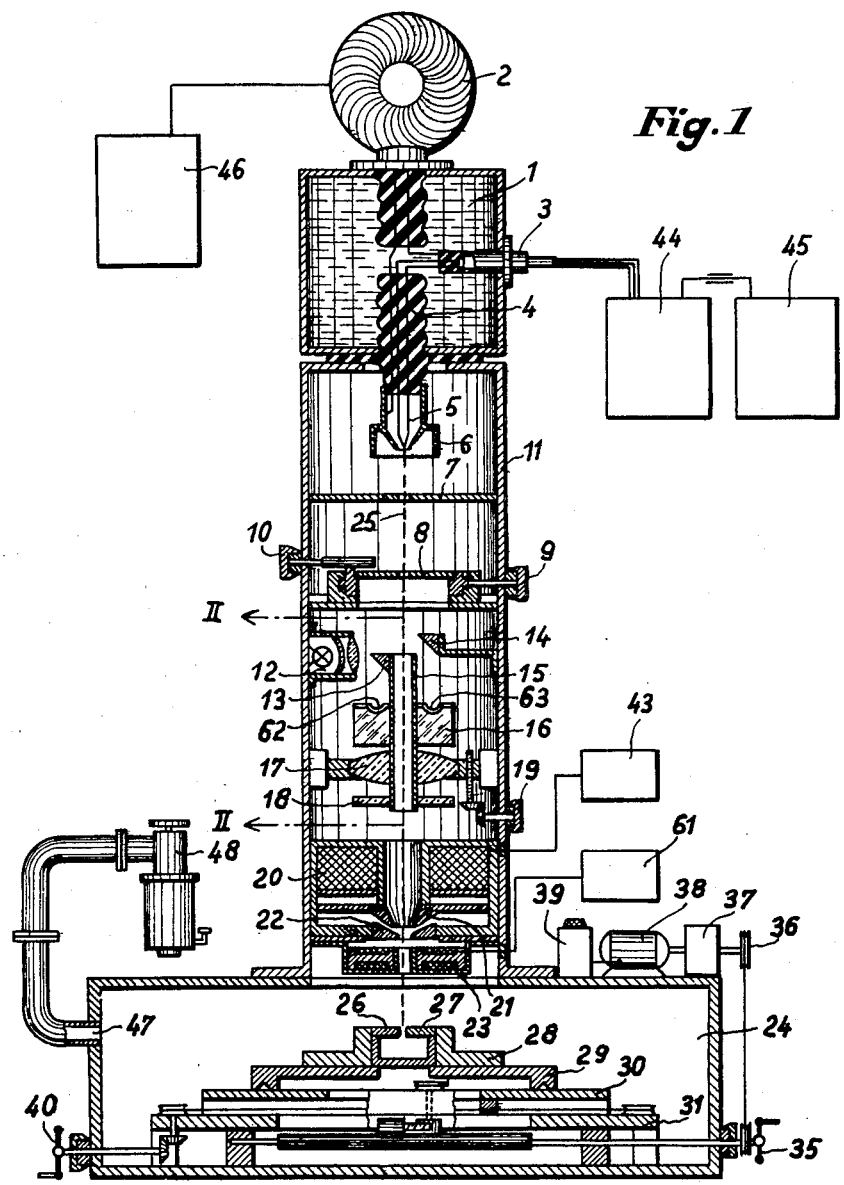
FIGURE 1 is a sectional view of an apparatus according to the invention for welding with the aid of an electron beam.

The apparatus comprises an oil-filled container 1, on which is mounted an insulated pulse transformer 2, the leads of which are brought into the container through an insulator attachment. A three-wire high-tension cable 3 and another insulator attachment 4 also dip into the container 1. The lines for feeding the filament voltage to th cathode 5 and for feeding the voltage to the Wehnelt cylinder 6 pass through the insulator attachment 4. The grounded anode 7 is shown underneath the Wehnelt cylinder 6.

A high potential of, for example, 100 kv. is generated in the source 45 and is fed to the potential contact device 44 by means of a high-tension cable provided with a ground sheath. The potential control device serves to produce the adjustable heating voltage and the adjustable Wehnelt-cylinder voltage. The potentials are introduced into the oil-filled container 1 by way of the three-wire high-tension cable 3 provided with a ground sheath. The cathode 5 is maintained at a' negative voltage with respect to ground, for example, −100 kv. The Wehnelt electrode is biased to a higher negative potential, example −101 kv. The bias potential is applied through the secondary winding of the pulse transformer.

A time base generator 46 serves to produce the control pulses. In the example illustrated, the device is at ground potential. The control pulses produced by the device 46 are fed to the primary winding of the pulse transformer 2. This winding is at ground potential. The secondary winding of the pulse transformer 2 is insulated from the primary winding with suitable high tension insulation since the secondary is at a high potential with respect to the primary. The transformer 2 is a step-up transformer, serving to convert the pulses fed to the primary winding to high-tension potential.

The arrangement is made in such a manner that the beam generating system 5, 6, 7 is at first locked, i.e., that no electron beam can leave the anode 7 as long as the pulse generating device 46 does not operate. This result is obtained in that the Wehnelt cylinder 6 is biased with a negative potential with respect to the cathode 5, for example, 1 kv. more negative. If the pulse generating device 46 is switched on, the Wehnelt cylinder is supplied with high potential positive pulses which reduce the Wehnelt negative bias to such an extent that an electron beam is able to leave the anode 7. The electron beam is blocked immediately upon termination of the control pulse by return of the Wehnelt potential to the negative bias.

Underneath the anode 7, seen in the direction of the beam, a diaphragm 8 is arranged which can be moved in the plane of the paper and perpendicularly to the plane of the paper by means of the knobs 9 and 10 respectively and the associate rack and pinions affixed thereto.

After the electron beam has been adjusted by displacement of the diaphragm 8, the beam falls through a grounded tube 15 and is focused at the work piece to be treated 26, 27 by means of an electromagnetic lens 20. The upper pole shoes of the electromagnetic lens 20 have the reference symbol 21, the lower pole shoes, 22. Current for establishment of the suitable field is supplied by source 43.

Underneath the electromagnetic lens 20, a deflecting system 23 is arranged which serves the purpose of moving the electron beam 25. The adjustable deflecting currents serving to supply the deflecting system 23 are generated in a source 61.

The deflecting system 23 consists of four coils arranged in the plane perpendicular to the direction of the beam, each of which is provided with a ferromagnetic core. The electron beam 25 falls through the opening of the deflecting system 23, within which the deflecting fields are built up. For further detail of the deflection system, reference is made to application S.N. 774,745, filed November 18, 1958, for Method and Device for Working Particles by Means of a Beam of Charged Particles.

The welding process is observed by means of an optical system, which permits of the microscopic top illumination of the work piece 26, 27. This system consists of a lighting system 12 which supplies light focussed in parallel rays. This light is reflected, by way of two metallic prisms 13 and 14 through perforations 62, 63 in a mirror 16, onto an axially displaceable lens 17 and is focussed by the lens onto the work piece. Underneath the lens 17 an interchangeable glass plate 18 is arranged which protects the lens 17 from possible contamination by metallic vapors. The lens 17 is moved in axial direction by a knob 19 and the associated gear drive.

The light reflected by the surface of the work piece 26, 27 is aligned in parallel by the lens 17 and is guided, by way of the mirror 16, into an observation system 49 comprising a stereomicroscope. (See FIG. 2.) The microscope 49 is of a structure known per se; only its objective has been replaced by the lens 17. Between the lens 17 and the other parts of the microscope 49 there is arranged in the wall 11 of the light-vacuum beam generating chamber a radiopaque glass 65 which protects the eyes of the observer against X-rays emanating from the work piece. There are also provided other filters especially those combined with the eyepieces of the microscope 49 for eliminating harmful radiation. The microscope is also provided with a magnifying changer 64 which permits observation of the surface of the work piece in various enlargements.

The wall 11 of the high-vacuum beam generating chamber is made of electrically conducting material and is grounded.

The electron beam 25 leaves the housing 11 through the aperture of the deflecting system 23 and enters a treatment chamber 24. Said treatment chamber is also provided with a conductive jacket and is grounded. In the chamber 24, the work piece to be treated is arranged on a compound table which permits movement of the object in two co-ordinate directions perpendicular to one another.

Electron-beam devices operating above 15,000 v. produce X-radiation. In order to protect the operator a properly constructed lead shield of adequate thickness is arranged in the treatment chamber 24. (This lead shield is not shown in FIG. 1.)

FIGURE 1 shows two plates 26 and 27 in the treatment chamber 24, which are to be welded together. Said plates are held in position by means of a clamping table 28 which, in turn, is mounted on a table 29. Table 29 is arranged on another table 30 which can be displaced in the paper plane. A table 31 serves to position the entire compound table.

Two hand wheels 35 and 40 serve to move the mechanical stage. Rotation of the hand wheel 40 will cause the table 30, by way of a cable, to move from left to right and vice versa. Operation of the hand wheel 35 will cause the table 29 to move perpendicularly to the drawing plane.

A motor drive is provided to produce uniform table motion in the direction of the seam. The motor drive comprises an electric motor 38 which drives a wheel 36 by way of a reduction gear box 37. The hand wheel 35 is driven by way of said wheel 36, so that there is a continuous motion of the mechanical stage in the direction of the seam when the motor 38 is switched on. The rotational speed of the motor 38 is controlled by a speed regulator 39.

The table 29 is preferably equipped with end-position (or limit) switches. Said end-position switches are not shown in FIGURE 1. In the usual arrangement the limit switches are connected in such a manner that the direction of rotation of the electric motor 38 is automatically reversed after operation of an end-position switch.

Figure 3:
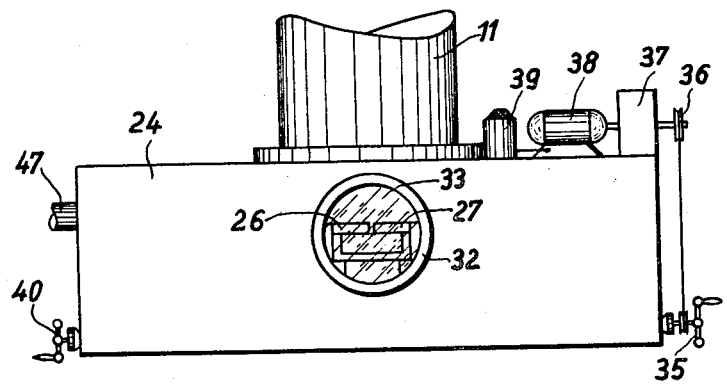
FIGURE 3 is a partial view of the apparatus shown in FIGURE 1.

The treatment chamber 24 is provided with an aperture 47, to which is connected a pumping apparatus indicated by the pump 48. This pumping apparatus keeps both the treatment chamber 24 and the housing 11 at high vacuum during the operation. As is apparent from FIGURE 3, the treatment chamber comprises a window 33 which permits simultaneous observation of the upper side and the underside of the work piece. The window 33 is fixed on the housing of the treatment chamber 24 by means of a ring 32.

Figure 4:
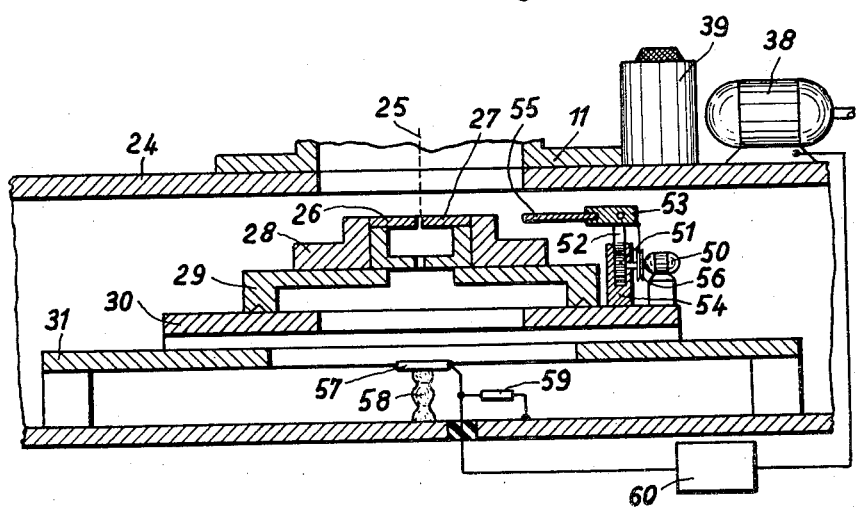
FIGURE 4 is a partial section through the treatment chamber of an apparatus for welding with the aid of an electron beam, which comprises a plate serving for the adjustment of the beam.

The apparatus for welding by means of an electron beam shown in FIGURE 4 comprises a plate 55 made of heat-resistant material which serves to adjust the electron beam. The plate is supported by hub 53. The hub 53, in turn, is hingedly connected to shaft 52 which has a rack affixed thereto. The rack engages a gear 51 which is driven by an electric motor 50. The shaft 52 slides in a guide 54. Also connected to the shaft of the motor 50 is a wheel 56 which communicates with the support 53 by way of a cable.

When the motor 50 is switched on, the plate 55 is moved up and down corresponding to the direction of rotation of the motor. The cable operated by way of the wheel 56 ensures that there is no tilting of the plate 55. If said plate is to be tilted, the gear 51 is separated from the rack of the shaft 52 by a coupling (not shown). When the motor 50 is now operated, only the wheel 56 rotates and the plate 55 is tilted.

To initiate a welding, the table 30 is first moved to the left to such an extent that the plate 55 is located under the place of impingement of the electron beam 25. Thereafter, appropriate operation of the electric motor 50 will cause the plate 55 to move or tilt in the desired manner to permit observation of beam impingement on the plate to allow the necessary focussing thereof. It may be especially advantageous to tilt the plate 55 and thereby to be able to observe the path of the electron beam, over a comparatively large area.

After the electron beam 25 has been adjusted, the table 30 is moved to the right to such an extent that the seam of the work pieces 26, 27 is located under the place of impingement of the electron beam 25. At the same time, the table 29 is moved forwardly until the place of impingement of the beam 25 is located ahead of the front end of the work pieces 26, 27. This position is selected so that the table 29, immediately after the electric motor 38 has been connected, has started to execute a uniform motion even before the welding beam 25 impinges on the work pieces.

It may be advantageous to provide the plate 55 with a water cooling or any other cooling; this is not shown in the drawing.

It may also be expedient to arrange a ledge made of the same material as the work pieces ahead of the front end of the work pieces 26, 27 to be welded together. This measure will help to avoid the occurrence of a broadly melted weld seam at the front end of the work pieces to be welded together.

After adjustment of the electron beam has been completed, the beam is switched off. When the work platforms have been adjusted, the motor 38 and the beam are switched on to start the welding process.

An electrode 57 is arranged underneath the work pieces to be welded together 26, 27 in the apparatus shown in FIGURE 4; said electrode is supported by means of an insulator 58. The electrode 57 is connected to ground by way of a resistor 59 and is at the same time connected to an amplifier 60.

If the welding apparatus is adjusted in such a manner that the electron beam completely penetrates the work pieces 26, 27 to be welded together, the electrode 57 receives an electric charge. Said charge flows off to ground by way of the resistor 59, and the voltage drop across the resistor 59 can for example, be used to regulate the speed of revolution of the motor 38. This will ensure that the work pieces 26, 27 are displaced at a velocity such that the electron beam always penetrates the two work pieces to the same extent. The voltage yielded by the amplifier may also be used to indicate the degree to which the electron beam 25 is penetrating the work pieces 26, 27.

Figure 5:
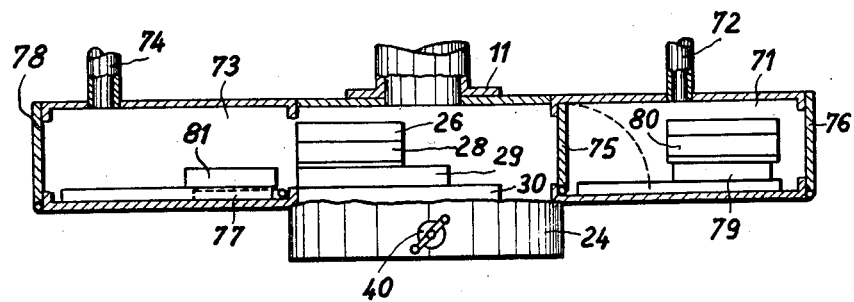
FIGURE 5 is a sectional view of a vacuum lock arrangement for discharging treated articles and introducing new articles, illustrated diagrammatically.

FIGURE 5 illustrates an apparatus, by means of which it becomes possible to discharge the worked objects from the high vacuum and to introduce new objects without disturbing the high vacuum in the device. For this purpose, two additional chambers 71 and 73, provided with respective pump connections 72 and 74, are laterally connected to the treatment chamber 24. Hinged doors 75 and 77 serve to seal said chambers with respect to the treatment chamber 24. Hinged doors 76 and 78 serve to seal said chambers 71 and 73 against external pressure. The chambers 71 and 73 contain movable cars 79 and 81 which can be moved toward the treatment chamber 24 and away from same by means of electric motors (not shown).

The apparatus shown in FIGURE 5 operates in the following manner:

After an object has been worked, the table 29 is moved into an end position. After this end position has been reached, the motor 38 is switched off either automatically or manually, whereupon the trap door 77 is opened and the car 81 is moved to the treatment chamber 24. Thereupon the object 26 together with the clamping table 28 is transported onto the car 81 by means of a suitable conveying mechanism (not shown). Said car then runs in the direction of the door 78, the door 77 is closed and the table 29 moves to the right end position. The trap door 75 is then opened, the car 79 is moved to the left, and a new object 80 is transported onto the table 29 by means of a conveying device (not shown). The car 79 then moves to the right, the door 75 is closed, and a new welding process can take place after proper adjustment has been made.

Figure 6:
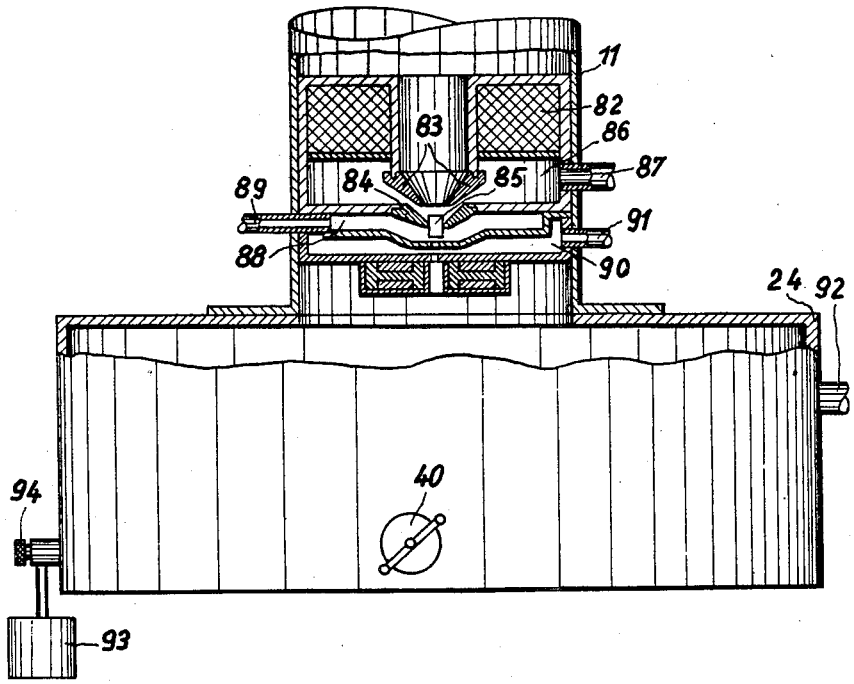
FIGURE 6 is a partial sectional view of an apparatus for welding with the aid of a beam of charged particles by making use of a pressure-stage system.

In order to be able to carry out weldings in which either a protective gas is present or a gaseous material for admixing is to be conveyed to the weld, the device shown in FIG. 6 is used. As is apparent from FIG. 6, an electromagnetic lens 82 is so developed that a sealed off chamber 86 is formed between its upper pole shoes 83 and its lower pole shoes 84. Said chamber is provided with a connection 87, to which a vacuum pump (not shown) is connected. The lower pole shoes 84 carry a narrow little tube 85, the cross section of which hampers the penetration of gas into the chamber 86, but does not prevent the passage of the electron beam. Underneath the chamber 86 is another chamber 88 which communicates with another vacuum pump by way of a connecting piece 89. Another chamber 90, which is also connected to a vacuum pump by way of a connecting piece 91, is arranged underneath the chamber 88. A deflecting system 23 is arranged underneath the chamber 90, just as shown in FIGURE 1.

The treatment chamber 24 is connected to a vessel 93 which feeds gas to the chamber 24 by way of a needle valve 94. The excess gas or the resulting reaction produced is withdrawn by means of a pump connected to a connecting piece 92.

The apparatus shown in FIGURE 7 serves the same purpose as the apparatus of FIGURE 6. In this case, an intermediate pressure chamber 95 connected to a vacuum pump by way of a connecting piece 97 is arranged between the treatment chamber 24 and the beam generating chamber 11. The chamber 95 contains a disc 96 which is rotated about shaft 99 by means of an electric motor 98. Said disc 96 is provided with an annular ring 100 through which pass holes 101. Said holes 101 are so moved between the apertures 102 and 103 at such speed that the time required by gas molecules entering one of the apertures 101 from the chamber 24 in order to reach the aperture 102 is longer than the time during which the apertures 101, 102, 103 are connected. The gas which has penetrated into the apertures 101 is sucked off through 97 when the connection 101, 102, 103 is closed.

The apparatus also provides for a control device (not shown), which switches on the electron beam as soon as the connection 101, 102, 103 is established, and which switches off the beam as soon as this connection is interrupted.

FIGURE 8a is a sectional view of two work pieces 126 and 127 which are welded together. This welding was carried out by means of a beam 125 which was focussed at the surface of the work pieces. 128 is the boundary line between the two work pieces. During the welding process, first, a small surface area of the work pieces is highly heated by means of the beam 125. The beam as such does not penetrate into the work pieces. Heat conduction will cause the melting of a comparatively large area of material 129, which fuses into a weld seam after the beam has been moved on.

FIGURE 8b, on the other hand, shows the same work pieces which have been welded together by means of the new welding process. As is readily apparent from FIGURE 8b, only a very narrow V-shaped melted area 130 is formed in this case.

The beam 125 is of an intensity such that, while melting the material during the welding process, it penetrates into same and, in so doing, yields its energy to the material over the entire depth of penetration. The melting zone 130 is formed in this manner; it is to be noted that the heat energy is fed simultaneously to all places of this zone.

The above considerations make it clearly apparent that the new welding process makes it possible to obtain substantially higher welding velocities than did the previously known welding processes, and that the area of material subjected to heat stress amounts to about only one tenth of the area subjected to heat stress in the known welding processes.

FIGURE 9 shows two thermally very different materials 131 and 132 which are welded along the seam 133. For this purpose, the beam 125 is focussed at the work piece 132 made of the material having the higher melting point. The resulting melting zone 134 also comprises a marginal region of the work piece 131 made of material having a lower melting point without there occurring any overheating of said material.

FIGURE 10 shows a set-up seam produced by means of the new process. In this case the beam is so adjusted that it impinges only on the work piece 136 and penetrates into same. The resulting melting zone 137 also comprises a narrow marginal region of the work piece 135. This manner of controlling the charge carrier beam ensures that only material originating from the work piece 136 is used for the welding process. This means that the strength of the work piece 135 is not diminished at any place.

FIGURE 11 shows a work piece 138 which has a shaped surface. Said work piece is welded together with a cover plate 139 and a base plate 140. To produce such a welding, the beam is focussed at the place 141 and penetrates at this place the plate 139 and the work piece 138. After the desired depth of penetration has been reached and after the beam has yielded a sufficient amount of energy to melt a sufficiently large area, the beam is switched off. The work pieces are then moved laterally to such an extent that, for example, the place 142 is located under the impingement position of the beam. The charge carrier beam is then switched on again and a spot weld is formed. After the cover plate 139 has been welded together with the work piece 138 at a sufficient number of places, the work piece is turned round, whereupon the base plate 140 is welded together with the work piece 138 in the manner described above. One of the welding places so formed has the reference symbol 143.

The welded work piece 138, 139, 140 shown in FIGURE 11 can be produced only by means of the new welding process since only one side of the work piece must be accessible for impingement of the beam. FIGURE 15b shows one of the resulting weldings by way of example. As is apparent from this figure, the weld 141 is V-shaped and has no constrictions between the work pieces 138 and 139.

In contradistinction thereto, FIGURE 15a shows a weld produced according to the conventional welding process. In a manner known to the art, a first electrode is applied to the work piece 138, and a second electrode, to the work piece 139 for the purpose of welding. The welding together produced during the passage of current have the reference symbols 144 and 145. These two weldings are so developed that they pass over into one another. However, it can be seen readily that the actual weld at the boundary line between the portions 138 and 139 is very narrow. For this reason, the welding is not very durable with respect to any forces which act laterally on the weld.

FIGURE 12 is the view of a work piece which is welded together with a work piece arranged underneath the first work piece. The two welds 146 and 147 are so developed that successively arranged point-like welding places are formed along a circular path about the fastening point selected. Said welds are, for example, so placed at 146 that each weld is distinctly separated from the next one. At 147 the charge carrier beam was guided in such a manner that the resulting welds are adjacent. Guiding the welding beam in the manner illustrated in FIGURE 12 will produce a maximum of strength of the resulting welds at a minimum of the energy used.

FIGURE 13 shows two plates 148 and 149 which are welded together. To produce the welding, the beam is so focussed at the plate 148 that it penetrates said plate as well as plate 149 arranged underneath it. The resulting welds have the reference symbol 150. This welding process is similar to the conventional spot welding process.

FIGURE 14 shows a cover plate 151 which is welded together with a work piece 152 positioned with an edge thereof contacting the cover plate. To produce the welding, the beam is so focussed at the plate 151 that it penetrates said plate and, beyond that, penetrates into the work piece 152 for a short distance. The resulting V-shaped melting ensures satisfactory welding together of the two work pieces. The weld has the reference symbol 153.

If the new welding process is to be used for welding together two work pieces which are separated by a groove having a transverse extension which is equal to or greater than the cross section of the charge carrier beam, the latter must be deflected periodically transversely to its direction of motion to such an extent that it covers a narrow marginal area about the weld. This measure causes a narrow marginal zone of the two work pieces to be melted, and the melted material fuses to form a proper weld when the beam is moved on.

The new welding process can also be used for welding together two plates, whereby a continuous weld is to be produced in contradistinction to the point-like weldings of FIGURE 13. To achieve this purpose, it is merely necessary so to move the beam over the plate facing it so that it penetrates said plate and the plate arranged underneath it and that the beam is moved along lines the melting zones of which are in contact.

The new process for welding with the aid of a beam was described in conjunction with the drawings by making use of an electron beam. Instead of using electron beams, it is equally possible to use beams of other charged particles, such as ions formed in a gaseous tube instead of the evaporated barrel of the electron gun.

All welding problems shown in FIGURES 8 to 15 can be solved both by means of a pulse controlled beam and by means of a continuously acting beam. This is the case because only a very small area of material is subjected to heat stress in the new welding process even when the welding beam impinges continuously on the work piece and because, in addition to the foregoing, the welding can be carried out very rapidly.

The invention can be variously modified and embodied within the scope of the subjoined claims.

What is claimed is:

1. The method of welding material by direct energy transfer to the material and without relying upon heat conduction through the material to melt the material to the desired weld depth which comprises focussing a beam of charged particles on the material to be welded and setting the beam intensity to penetrate into the material and to fuze the material over the entire depth of the penetrating beam.

2. The method according to claim 1 in which the beam intensity is regulated to completely penetrate the material.

3. The method according to claim 1 in which the penetration of the beam into the material is measured and the material is moved to form a weld seam at a rate responsive to said measurement to maintain the penetration depth constant.

4. The method of welding together two materials by direct energy transfer to the materials and without reliance upon heat conduction through the material to melt the material to the desired weld depth which comprises focussing a beam of charged particles on one of said materials to be welded together and setting the beam intensity to penetrate through the said one of said materials and into the other of said materials and to melt the materials over the entire depth of the penetrating beam and to fuze the materials.

5. The method in accordance with claim 4 which includes the step of fuzing the materials together at a plurality of positions along the periphery of a circle having its center at the desired position of attachment of the materials.

6. The method in accordance with claim 4 in which one material is positioned so that the edge thereof is in contact with the inside surface of the other material and is covered thereby and which includes the step of focussing the beam so that it penetrates through the covering material and penetrates the edge of the enclosed material in the direction of the enclosed material.

7. The method of welding together two materials along a seam between the materials by direct energy transfer to the materials and without reliance upon heat conduction through the material to melt the material to the desired weld depth which comprises focussing a beam of charged particle at the seam between the materials to be welded and setting the beam intensity to penetrate into the materials and simultaneously to heat said materials along the entire depth of the penetrating beam until the materials melt and fuze together.

8. The method in accordance with claim 7 in which the beam is focussed to yield its energy equally to both materials.

9. The method according to claim 7 in which the materials to be welded together have different thermal characteristics and which includes focussing the charge carrier beam at the materials to be welded so that the ratio of the energy supplied to each material corresponds to the ratio of the thermal characteristics of the respective materials.

10. The method according to claim 7 in which the materials to be welded are separated by a groove having a transverse dimension as great as or greater than the cross section of the beam, which includes periodically deflecting the beam transversely to its direction of motion to such an extent that it impinges upon a narrow marginal area about the weld seam.

11. The method according to claim 7 which includes focussing the beam at the work pieces to be welded so that the beam penetrates only into the work piece consisting of the material having the higher melting point in the immediate vincinity of the weld seam.

References Cited in the file of this patent

UNITED STATES PATENTS

| | | |
|---|---|---|
| 2,746,420 | Steigerwald | May 22, 1956 |
| 2,778,926 | Schneider | Jan. 22, 1957 |
| 2,809,905 | Davis et al. | Oct. 15, 1957 |
| 2,819,380 | Eaton | Jan. 7, 1958 |
| 2,824,232 | Steigerwald | Feb. 18, 1958 |
| 2,844,706 | Lorenz | July 22, 1958 |
| 2,899,556 | Schopper et al. | Aug. 11, 1959 |
| 2,932,720 | Stohr | Apr. 12, 1960 |